United States Patent Office 2,822,349
Patented Feb. 4, 1958

2,822,349
REACTIONS OF DIISOCYANATE - MODIFIED LINEAR POLYESTERS WITH UREA GLYCOLS

Karl E. Müller, Leverkusen-Bayerwerk, Wilhelm Bunge, Leverkusen, and Cornelius Mühlhausen, Leverkusen-Bayerwerk, Germany, assignors to Farbenfabriken Bayer Aktiengesellschaft, Leverkusen, Germany, a corporation of Germany No Drawing. Application February 9, 1954
Serial No. 409,254

Claims priority, application Germany February 26, 1953

1 Claim. (Cl. 260—75)

This invention relates to synthetic polymeric products of high molecular weight and to a process for their production. The purpose of the invention is to provide an improved process for the production of diisocyanate-modified polyesters which can be handled in the liquid phase.

It is known to produce cross-linked polymeric products by reacting linear polyesters containing hydroxyl end groups with a quantity of organic diisocyanates in excess of the amount required to react with the hydroxyl groups.

In this reaction the chains of the polyesters become linked by urethane groups to form linear compounds containing free isocyanate end groups. The molecular weight of these isocyanate-modified polyesters increases as the excess of diisocyanate over the quantity required for the reaction with the hydroxyl groups decreases, or vice versa. The isocyanate-modified polyesters thus obtained can be converted to high-grade, cross-linked products according to one of three processes.

The first of these processes consists in reacting the isocyanate-modified polyesters with water, whereby two isocyanate groups are linked by urea-linkage. This process leads to the production of a high molecular weight product. The NH-groups of the urea linkages react with further isocyanate groups: in this way a cross-linked product is formed. This process yields high grade products, but suffers from the disadvantage that carbon dioxide is set free in the reaction of the isocyanate groups with water, and the gas bubbles prevent processing of the material in the liquid phase.

The second process uses glycol instead of water. When the isocyanate-modified polyesters react with glycols the polyester chains are extended by means of linking by urethane groups, and then further isocyanate groups react with the hydrogen atoms of the resultant urethane groups to give cross-linking in the molecule. This process gives high grade cross-linked products, as does the cross-linking reaction with water, but is distinguished from the cross-linking reaction with water in that no carbon dioxide is formed. This process using glycol therefore allows processing in the liquid phase, and the production of moldings of the most different shapes by casting processes in the absence of solvents.

The third process uses diamines instead of glycols; the isocyanate-modified polyester chains are then extended by linking by two urea groups, and the hydrogen atoms of the urea groups react with the isocyanate groups to give cross-linking, as described with reference to the first process. This third process again proceeds without the evolution of carbon dioxide.

The present invention is based on the discovery that new, valuable and cross-linked products with rubber-like elastic properties can be obtained by treating isocyanate-modified polyesters with glycols containing at least one —NH—CO—NH— or >N—CO—NH$_2$ group in the molecule between the hydrocarbon radicals carrying the hydroxyl groups, and causing the urea glycols to react to completion with the resulting polyaddition product while simultaneously shaping the product to the desired form. The most simple representative of these glycols is N,N'-dihydroxyethyl urea of the formula

HO.CH$_2$.CH$_2$.NH.CO.NH.CH$_2$.CH$_2$.OH which is obtained by conventional methods, for instance by reacting oxazolidone and ethanolamine, or by boiling ethanolamine and urea in acid solution. Further glycols suitable for the process of the invention are ethanolbutanol ureas, and compounds containing the urea group twice in the molecule, which are obtained for instance by reacting ethylenediamine with two mols of oxazolidone. Also, it is possible to use N-dihydroxyethyl urea obtained by reacting diethanolamine with 1 mol of potassium cyanate.

By reacting the aforesaid glycols with isocyanate-modified polyesters the chains of the isocyanate-modified polyesters are extended during incorporation of the urea group as urethane groups. The newly formed urethane groups, as well as the incorporated urea groups, can then react with any isocyanate groups present to give cross-linking in the molecules. This process, like the cross-linking reaction with glycols and diamines, is an addition reaction. The process, therefore, is a combination of the cross-linking reaction as carried out with water and glycols, in which the disadvantages of the cross-linking using water are eliminated by the presence of the urea groups in the urea glycols.

The process of the invention is carried out by reacting the urea glycol with the isocyanate-modified polyester. The quantitative proportions of the reactants are preferably chosen so that the —NCO groups remain in slight excess by using an amount of glycol slightly less than the stoichiometrical proportion. Then cross-linking can take place as the mixture is being molded. Alternatively, the urea glycols may be employed in a proportion equivalent to the isocyanate groups present, and 1-5% of a diisocyanate incorporated into the linear compound so obtained prior to molding.

The advantage of the new process over the previously known methods is that the cross-linking reaction proceeds more rapidly, probably due to the weakly basic reaction of the urea glycols. For this reason the mixture can be removed from the molds within a short time. Furthermore, the urea glycol cross-linking reaction allows the production of high grade polymeric products with excellent mechanical properties even with isocyanates which, in the cross-linking reaction with glycols, yield products only of medium quality.

Suitable isocyanates for the process of the invention are for instance diphenylmethane diisocyanate, 1,5-naphthylene diisocyanate and p-phenylene diisocyanate.

The linear polyesters which are preferably employed as starting materials are prepared from substantially saturated aliphatic products. Examples of suitable acids are adipic acid, succinic acid, sebacic acid and thiodipropionic acid. As glycols there may be employed for instance ethylene glycol, 1,4-butylene glycol, 1,3-butylene glycol, or diethylene glycol. Also other bifunctional reactants may be added in minor quantities, instead of glycols and dicarboxylic acids. Examples of such compounds are diamines, hydroxyamines, dihydroxyureas and dihydroxyurethanes.

Acids or tertiary organic bases may also be added to control the reaction velocity between the addition products of the isocyanate-modified polyester and the urea glycol.

The invention is further illustrated by the following examples without being restricted thereto.

Example 1

200 grams of a glycol adipic acid polyester of the hydroxyl number 56 (=1.7% of —OH groups) are dehydrated at 120° C. under 12 mm. pressure. After adding 35 grams of 1,5-naphthylene diisocyanate with stirring the temperature rises to 139° C. As soon as the temperature has dropped to 130° C., 6.6 grams of N,N'-β-dihydroxyethylurea (M. P. 87° C.) are added with stirring and the homogeneous melt is cast into molds. The moldings thus obtained can be removed after 10 minutes. A highly elastic material with the following properties is obtained by heating the moldings at 100° C. for 24 hours:

| | |
|---|---:|
| Tensile strength _____kg./cm.² | 260 |
| Elongation at break _____percent | 600 |
| Permanent set _____do | 10 |
| Tear resistance _____ | 34 |
| Resilience _____ | 49/61 |
| Hardness _____ | 80 |
| Load at 300% elongation _____ | 59 |

Example 2

By carrying out the reaction of Example 1 with 38 grams of diphenylmethane diisocyanate, instead of with 1,5-naphthylene diisocyanate, a product with the following properties is obtained:

| | |
|---|---:|
| Tensile strength _____kg./cm.² | 180 |
| Elongation at break _____percent | 620 |
| Permanent set _____do | 7 |
| Tear resistance _____ | 32 |
| Resilience _____ | 51/67 |
| Hardness _____ | 59 |
| Load at 300% elongation _____ | 29 |

Example 3

The product obtained according to Example 2 is not cast into molds but rolled and shaped under pressure after the reaction is complete. This product has the following properties:

| | |
|---|---:|
| Tensile strength _____kg./cm.² | 160 |
| Elongation at break _____percent | 555 |
| Permanent set _____do | 7 |
| Tear resistance _____ | 31 |
| Resilience _____ | 52/71 |
| Hardness _____ | 64 |
| Load at 300% elongation _____ | 38 |

Example 4

200 grams of a glycol adipic acid polyester of the hydroxyl number 56 (=1.7% of OH groups) are reacted after dehydration with 40 grams of diphenylmethane diisocyanate and, after the reaction has subsided, reacted with N,N'-dihydroxyethylurea in a quantity (8.9 grams) equivalent to that of the free isocyanate groups. The product thus obtained can be made into a sheet on the roll. 6 grams of 1,5-naphthylene diisocyanate are incorporated by rolling before shaping. A highly elastic product with the following properties is obtained:

| | |
|---|---:|
| Tensile strength _____kg./cm.² | 250 |
| Elongation at break _____percent | 635 |
| Permanent set _____do | 10 |
| Tear resistance _____ | 30 |
| Resilience _____ | 43/38 |
| Hardness _____ | 62 |
| Load at 300% elongation _____ | 35 |

We claim:

A process for the production of high molecular weight products from the polyaddition product of (a) a linear polyester which is a condensation reaction product of a saturated aliphatic dicarboxylic acid and a saturated glycol, and (b) an amount of organic diisocyanate in excess of the quantity required to react with the said hydroxyl groups, which comprises adding to the said polyaddition product an amount about 1.5–4.5% less than the stoichiometric amount of a urea glycol of the formula:

$$HO.CH_2.CH_2.NH.CO.NH.CH_2.CH_2.OH$$

whereby the urea glycol reacts to completion with the polyaddition product while simultaneously shaping the product.

References Cited in the file of this patent

UNITED STATES PATENTS 2,621,166    Schmidt et al. _____ Dec. 9, 1952

OTHER REFERENCES

Chem. Abs., 1950, page 5105e.